United States Patent
Bohler et al.

(10) Patent No.: US 9,485,826 B2
(45) Date of Patent: Nov. 1, 2016

(54) LIGHTING COLOR CONTROL

(71) Applicants: Christopher Lee Bohler, Peachtree City, GA (US); Li Li, Peachtree City, GA (US); Scott David Wegner, Peachtree City, GA (US)

(72) Inventors: Christopher Lee Bohler, Peachtree City, GA (US); Li Li, Peachtree City, GA (US); Scott David Wegner, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/483,957

(22) Filed: Sep. 11, 2014

(65) Prior Publication Data

US 2015/0069923 A1    Mar. 12, 2015

Related U.S. Application Data

(60) Provisional application No. 61/876,339, filed on Sep. 11, 2013.

(51) Int. Cl.
*H05B 33/08* (2006.01)

(52) U.S. Cl.
CPC ...... *H05B 33/0857* (2013.01); *H05B 33/0827* (2013.01); *H05B 33/0818* (2013.01); *H05B 33/0821* (2013.01); *Y02B 20/341* (2013.01)

(58) Field of Classification Search
USPC ............ 315/247, 246, 224, 225, 185 S, 291, 315/307–326
See application file for complete search history.

(56) References Cited

U.S. PATENT DOCUMENTS

| | | | | |
|---|---|---|---|---|
| 8,330,393 | B2* | 12/2012 | Thomson | H05B 33/0815 315/209 R |
| 8,441,196 | B2* | 5/2013 | Liu | H05B 33/086 315/185 R |
| 8,742,695 | B2 | 6/2014 | Wray | |
| 2010/0109557 | A1* | 5/2010 | Bouchard | H05B 33/0818 315/294 |
| 2011/0089866 | A1 | 4/2011 | Trotter et al. | |
| 2011/0187290 | A1 | 8/2011 | Krause | |
| 2012/0146519 | A1 | 6/2012 | Briggs | |
| 2013/0154484 | A1 | 6/2013 | Xu | |
| 2013/0175947 | A1 | 7/2013 | Hamel et al. | |

FOREIGN PATENT DOCUMENTS

WO    WO 2011057682    5/2011

OTHER PUBLICATIONS

International Search Report for PCT/US2014/055208, mailed Dec. 25, 2014.

* cited by examiner

*Primary Examiner* — Tuyet Vo
(74) *Attorney, Agent, or Firm* — King & Spalding LLP

(57) ABSTRACT

A lighting device includes a plurality of light emitting diodes (LEDs) configured to emit a light. The lighting device further includes a color controller configured to repeatedly assert and deactivate a control signal to control whether one or more LEDs of the plurality of LEDs are turned on or turned off. The color controller asserts the control signal for a first time period and deactivates the control signal for a second time period, where a color of the light emitted by the plurality of LEDs depends on the first time period and the second time period. The color controller changes the color of the light emitted by the plurality of LEDs by changing one or both of the first time period and the second time period.

20 Claims, 7 Drawing Sheets

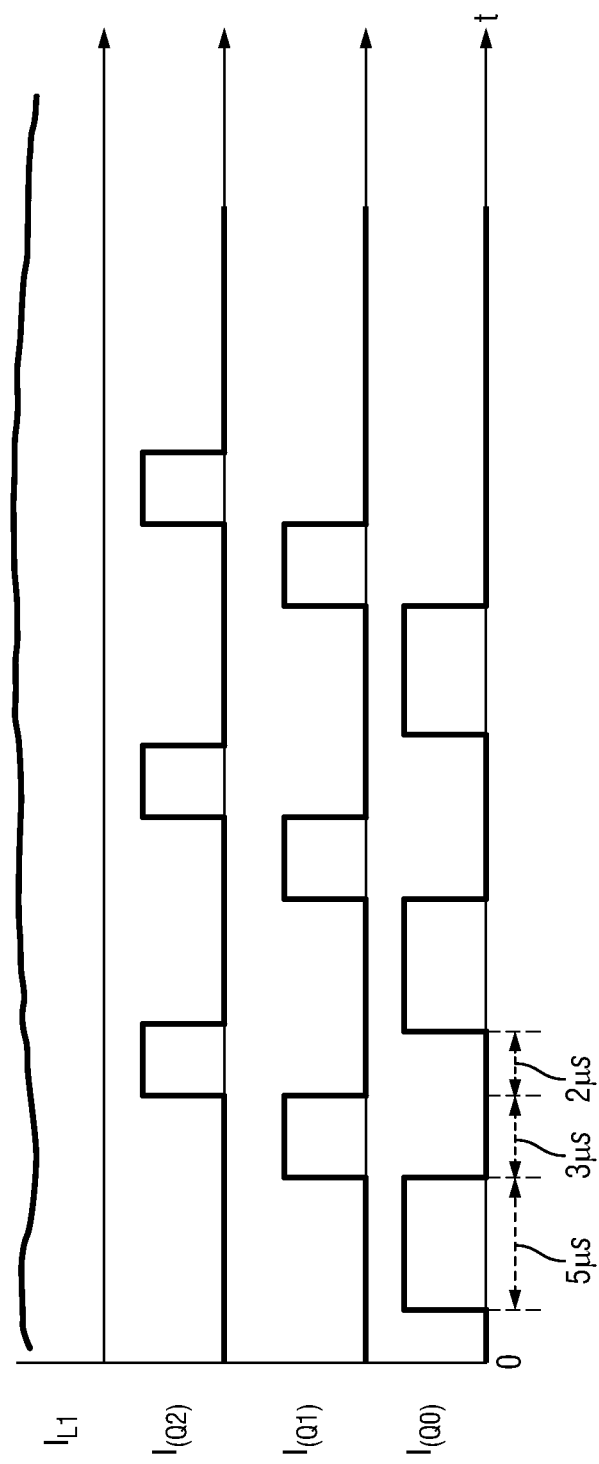

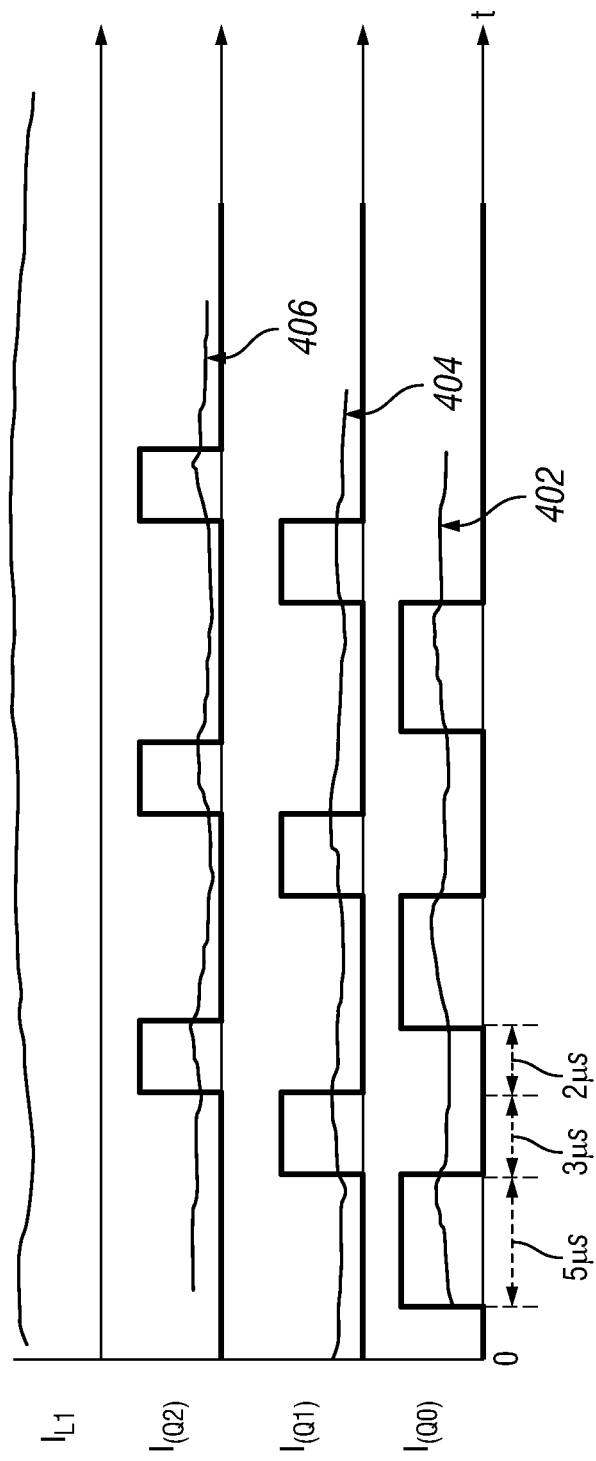

LIGHTING COLOR CONTROL

CROSS REFERENCE TO RELATED APPLICATIONS

The present application claims priority to under 35 U.S.C. §119(e) and incorporates herein by reference U.S. Provisional Patent Application No. 61/876,339, titled "Lighting Color Control," and having a filing date of Sep. 11, 2013.

TECHNICAL FIELD

The present disclosure relates generally to lighting solutions, and more particularly to color control for a lighting device.

BACKGROUND

Some lighting devices produce light that has a particular color. Controlling the particular color of the light provided by a lighting device enables use of the lighting device in various applications. One of the factors that may affect the color of light provided by a lighting device is the intensity of the light emitted by individual light sources or groups of light sources of the lighting device. For example, each group of light sources of a lighting device may emit a different color light that is combined with other colors of light from other groups of light sources to generate the particular color light provided by the lighting device. Typically, the intensity of the light emitted by a group of light sources is dependent on the power provided to the group of light sources.

A driver (e.g., an LED driver) is often used to provide power to the light sources of a lighting device. For example, a multi-output driver may have multiple power outputs that provide different levels of power to different groups of light sources to control the intensity of light emitted by each group. In some applications, a dimmer may be used to control the power that is provided by the multi-output driver to each of the different groups of light sources and thus to control the intensity of light emitted by each group. For example, multiple control outputs of a dimmer may be coupled to the multi-output driver to control the power supplied by the multi-output driver on each of its power outputs. However, because of compatibility issues between dimmers and drivers, different multi-output drivers are generally required for use with different types of dimmers that control power outputs of a multi-output driver. Thus, a solution that allows a single output driver to be used for providing power to multiple groups of light sources that emit lights that are combined to produce a particular color light is desirable.

SUMMARY

The present disclosure relates generally to lighting solutions. In an example embodiment, a lighting device includes a plurality of light emitting diodes (LEDs) configured to emit a light. The lighting device further includes a color controller configured to repeatedly assert and deactivate a control signal to control whether one or more LEDs of the plurality of LEDs are turned on or turned off. The color controller asserts the control signal for a first time period and deactivates the control signal for a second time period, where a color of the light emitted by the plurality of LEDs depends on the first time period and the second time period. The color controller changes the color of the light emitted by the plurality of LEDs by changing one or both of the first time period and the second time period.

In another example embodiment, a lighting fixture includes a light emitting diode (LED) driver and a lighting device. The LED driver provides power to the lighting device. The lighting device includes a plurality of light emitting diodes (LEDs) configured to emit a light. The lighting device further includes a color controller that is configured to repeatedly assert and deactivate a control signal to control whether one or more LEDs of the plurality of LEDs are turned on or turned off. The color controller asserts the control signal for a first time period and deactivates the control signal for a second time period, where a color of the light emitted by the plurality of LEDs depends on the first time period and the second time period. The color controller changes the color of the light emitted by the plurality of LEDs by changing one or both of the first time period and the second time period.

In another example embodiment, a method of controlling a color of a light emitted by a lighting device includes providing a current to a plurality of light emitting diodes (LEDs) that are configured to emit a light. The method further includes asserting, by a color controller, a control signal for a first time period and deactivating, by the color controller, the control signal for a second time period. A color of the light emitted by the plurality of LEDs depends on the first time period and the second time period, and asserting and deactivating the control signal controls whether the current flows through one or more LEDs of the plurality of LEDs. The method also includes changing one or both of the first time period and the second time period to change the color of the light emitted by the plurality of LEDs.

These and other aspects, objects, features, and embodiments will be apparent from the following description and the appended claims.

BRIEF DESCRIPTION OF THE FIGURES

Reference will now be made to the accompanying drawings, which are not necessarily drawn to scale, and wherein:

FIGS. 4A and 4B illustrate signal traces corresponding to signals of the control device of FIG. 2 according to an example embodiment;

Figure 1:
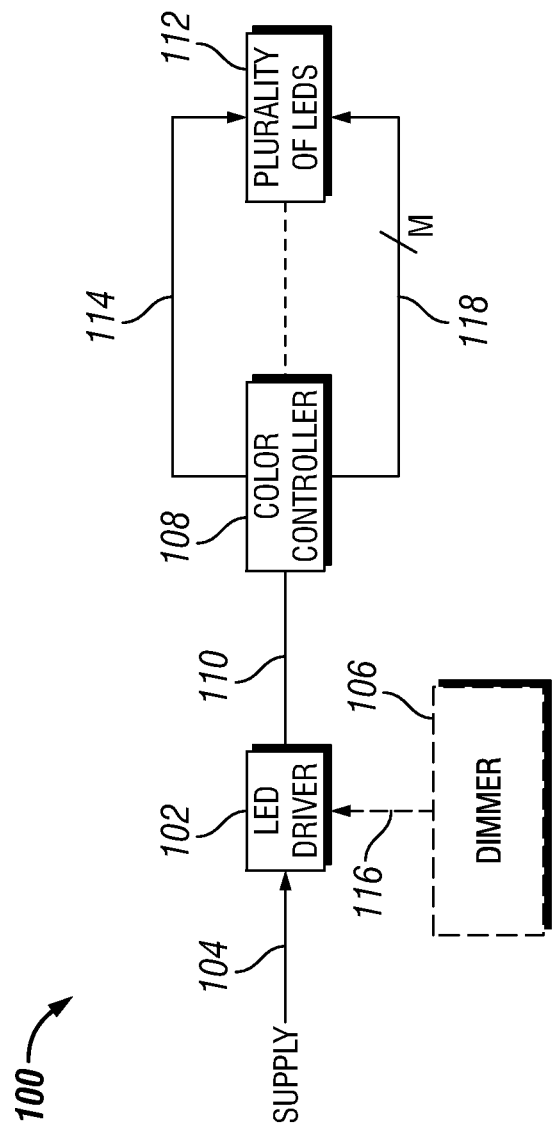
FIG. 1 is a block diagram illustrating a circuit for controlling the color of light emitted by a plurality of light emitting diodes (LEDs) according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

Turning now to the figures, particular embodiments are described. FIG. 1 is a block diagram illustrating a lighting device 100 including a color controller for controlling color of light emitted by a plurality of light emitting diodes (LEDs) according to an example embodiment. For example, the lighting device 100 may be a lighting fixture. The lighting device 100 includes an LED driver 102, a dimmer 106, a color controller 108, and a plurality of LEDs 112. As illustrated in FIG. 1, power is supplied to the LED driver 102 from a power source (SUPPLY) via a supply connection 104. In some example embodiments, the power source (SUPPLY) may be an alternating current (AC) power source. For example, the power source (SUPPLY) may be a 120-volt, 60-Hertz power supply.

In some example embodiments, the LED driver 102 may generate the output power based on the power supplied by the power supply (SUPPLY) and a control signal from the dimmer 106. The dimmer 106 is coupled to the LED driver 102 via a connection 116 and the control signal to the LED driver 102 via the connection 116. The LED driver 102 may provide power to the color controller 108 via a connection 110. The LED driver 102 may also provide power to the plurality of LEDs 112. For example, a connection 114 between the color controller 108 and the plurality of LEDs 112 may be used to provide power to the plurality of LEDs 112 based on the power provided by the LED driver 102 via the connection 110. In some alternative embodiments, the LED driver 102 may provide power to the plurality of LEDs 112 without going through the color controller 108. For example, the connection 110 may be coupled to both the color controller 108 and to the plurality of LEDs 112. In some example embodiments, the LED driver 102 may provide direct current (DC) power to the color controller 108 and to the plurality of LEDs 112.

In some example embodiments, the dimmer 106 may control the amount of current the LED driver 102 outputs on the connection 110. For example, the LED driver 102 may output a first current amount on the connection 110 based on a first value of the control signal on the connection 116 and may generate a second amount of current based on a second value of the control signal. In some alternative embodiments, the lighting device 100 may not include the dimmer 106.

In some example embodiments, the color controller 108 outputs intensity control signals via connections 118 to control the color of light emitted by the plurality of LEDs 112. To illustrate, the plurality of LEDs 112 may include different groups of LEDs, and each group of LEDs may be designed to emit a particular color light. Each one of the intensity control signals provided on the connections 118 may control the amount of current provided to a corresponding group of LEDs, for example, by controlling a current path for the group of LEDs. By controlling the amount of current provided to a particular group of LEDs, the color controller 108 may control the intensity of a particular color light emitted by the particular group of LEDs. By controlling the intensity of different color lights emitted by the different groups of LEDs, the color controller 108 may control the overall color of the light resulting from the combination of the different color lights emitted by the plurality of LEDs 112. The color controller 108 may be a standalone module, onboard circuitry embedded into an LED board, or circuitry integrated into a constant current driver to reduce the total number of parts.

Figure 2:
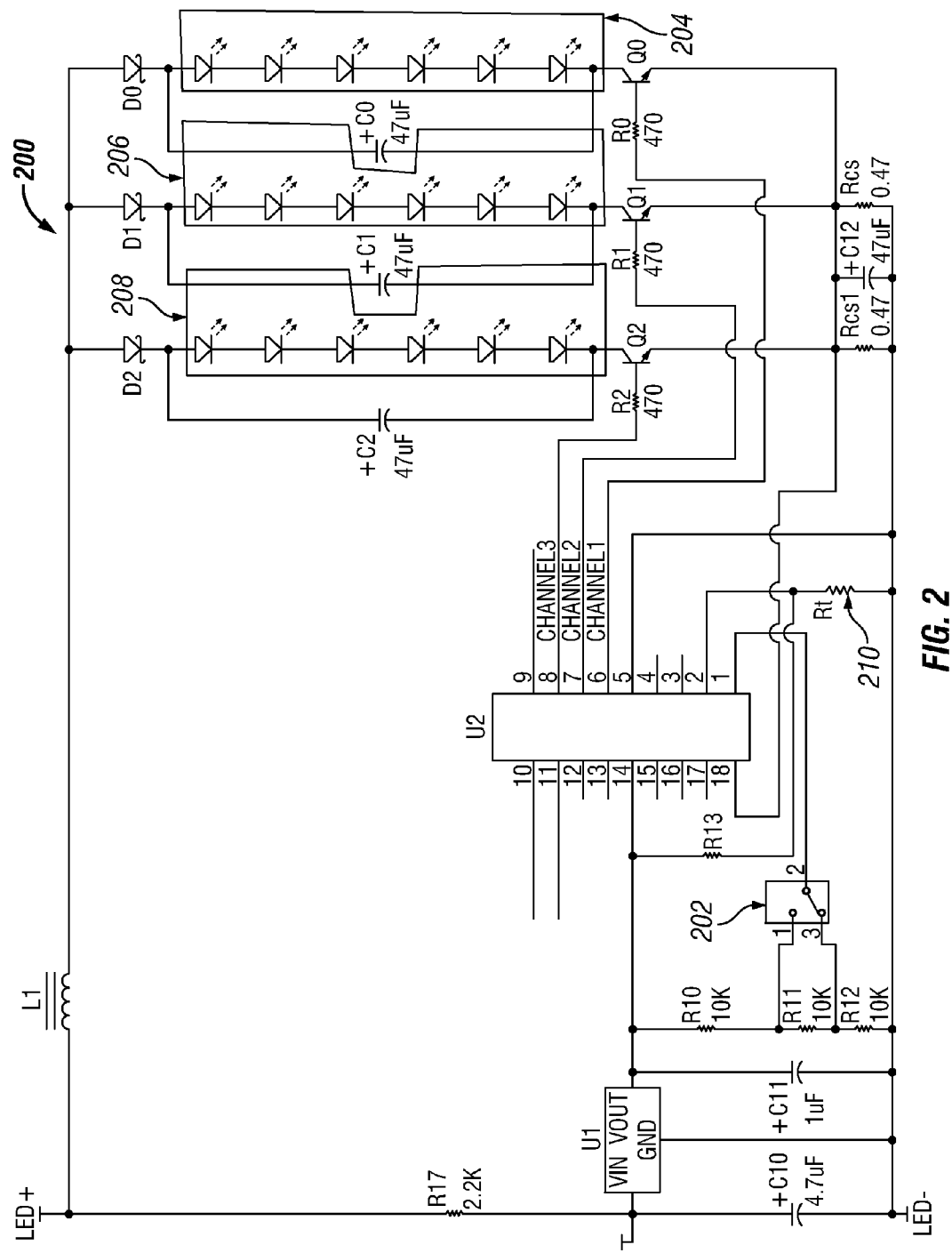
FIG. 2 is a diagram illustrating a lighting device including color controller circuitry according to an example embodiment.

FIG. 2 is a diagram illustrating a lighting device 200 including color controller circuitry according to an example embodiment. The lighting device 200 includes a voltage regulator U1, a controller U2, a switch 202, transistors Q0, Q1, Q2, diodes D0, D1, D2, and three groups of LEDs 204, 206, 208. As shown in FIG. 2, the groups of LEDs 204, 206, 208 are coupled in a parallel configuration with each other, and each transistor Q0, Q1, Q2 is in series with the respective group of LEDs 204, 206, or 208. In some example embodiments, the color controller 108 of FIG. 1 may include all elements shown in FIG. 2 except for the three groups of LEDs 204, 206, 208, the transistors Q0, Q1, Q2, and the diodes D0, D1, D2.

In some example embodiments, the voltage regulator U1 is electrically coupled to the power output of an LED driver, such as the LED driver 102 of FIG. 1, via ports LED+ and LED−. To illustrate, an input pin (Vin) of the voltage regulator U1 is coupled to the LED+ port via a resistor R17, and to the LED− port via a capacitor C10. For example, the voltage difference between ports LED+ and LED− may be between 18-22 volts, and the voltage at the input pin (Vin) may be between 5 and 12 volts. As an illustrative example, the resistor R17 may have 2.2 kohms resistance, and the capacitor C10 may have 4.7 microfarads capacitance. An output pin (Vout) of the voltage regulator U1 is coupled to a power pin (pin 14) of the controller U2 to provide power to the controller U2. For example, the voltage at the output pin (Vout) may be approximately between 4 volts and 5 volts.

In some example embodiments, the controller U2 can generate control signals, Channel1, Channel2, Channel3, to control intensity of light emitted by multiple groups of LEDs. For example, the controller U2 can generate the control signals, Channel1, Channel2, Channel3, to control the groups of LEDs 204, 206, 208, by controlling the amount of current that flows through each group of LEDs 204, 206, 208. For example, an LED driver, such as the LED driver 102 of FIG. 1, may provide the current to the groups of LEDs 204, 206, 208 through an inductor L1 and through the diodes D0, D1, D2. The diodes D0, D1, D2 may prevent current back flow towards the inductor L1.

In some example embodiments, the control signal Channel1 may control the first group of LEDs 204, the control signal Channel2 may control the second group of LEDs 206, and the control signal Channel3 may control the third group of LEDs 208. To illustrate, the control signal Channel1 may control whether a transistor Q0 is turned on (that is, in on-state) or turned off (that is, in off-state). When the transistor Q1 is in the on-state, the current from the LED driver (e.g., the LED driver 102 of FIG. 1) may flow through the first group of LEDs 204. Similarly, the control signal Channel2 may control whether a transistor Q1 is in the on-state or in the off-state, and thus may control whether the current from the LED driver flows through the second group of LEDs 206. The control signal Channel3 may similarly control whether the current from the LED driver flows through the third group of LEDs 208 by controlling whether the transistor Q2 is turned on or off. Other control signals may be used to control current flow through other groups of LEDs in a similar manner or may be unused.

In some example embodiments, the controller U2 may be configured to assert only one of the control signals, Channel1, Channel2, or Channel3, at a time such that only one of the transistors, Q0, Q1, or Q2, is turned on during a particular duration of time. Asserting the control signal Channel1, Channel2, or Channel3 refers to providing a voltage level on the respective control signal such that the control signal turns on the corresponding transistor Q0, Q1, or Q2. Deasserting (or deactivating) the control signal Channel1, Channel2, or Channel3 refers to providing a voltage level on the respective control signal such that the control signal turns off the corresponding transistor Q0, Q1, or Q2. To illustrate, the control signal Channel1 may be asserted for a first time period to turn on the transistor Q0 and may be deactivated for a second time period to turn off the transistor Q0. The control signal Channel2 may be asserted for a third time period to turn on the transistor Q1 and may be deactivated for a fourth time period to turn off the transistor Q1. The control signal Channel3 may be asserted for a fifth time period to turn on the transistor Q2 and may be deactivated for a sixth time period to turn off the transistor Q2. The time periods may be the same or different from each other.

In some example embodiments, the controller U2 may repeatedly assert and deactivate the control signals Channel1, Channel2, Channel3 every N cycles of a clock signal in the manner described above. To illustrate, the controller U2 may assert the control signal Channel1 for X clock cycles of a clock signal and may deactivate the control signal Channel1 for the remainder of the N cycles. The controller U2 may assert the control signal Channel2 for Y clock cycles of the clock signal and may deactivate the control signal Channel2 for the remainder of the N cycles. Similarly, the controller U2 may assert the control signal Channel3 for Z clock cycles of a clock signal and may deactivate the control signal Channel3 for the remainder of the N cycles. For example, the number of clock cycles X, Y, and Z may correspond to the number of cycles of a clock signal (not shown) provided to the controller U2. In some example embodiments, the numbers of clock cycles X, Y, and Z may add up to N cycles of the clock signal. In some example embodiments, the clock signal may have a frequency of several kilohertz or megahertz. For example, the clock signal may have a frequency of 30 kilohertz.

By controlling durations of assertion and deactivation of each control signal, Channel1, Channel2, Channel3, the controller U2 controls the average current that flows through the respective group of LEDs 204, 206, 208. Thus, the controller U2 can control the intensity of light emitted by each group of LEDs 204, 206, 208 by controlling the average current that flows through each group of LEDs 204, 206, 208. By repeating the assertion and deactivation of the control signals Channel1, Channel2, Channel3 every N clock cycles, the controller U2 can continuously control the intensity of light emitted by each group of LEDs 204, 206, 208. Because each group of LEDs 204, 206, 208 may emit a light having a color that is different from the color of the light emitted by the remaining one or more groups of LEDs 204, 206, 208, the controller U2 can control the color of the combined light emitted by the lighting device 200.

In some example embodiments, the lighting device 200 may further include capacitors C0, C1, and C2. As illustrated in FIG. 2, the capacitor C0 is coupled in parallel with the first group of LEDs 206. The capacitor C1 is coupled in parallel with the second group of LEDs 208. The capacitor C2 is coupled in parallel with the third group of LEDs 210. Each capacitor C0, C1, C2 serves to smooth out transitions of current flow through the respective group of LEDs 204, 206, or 208 when the respective transistor Q0, Q1, or Q2 switches between the on-state and the off-state based on the respective control signal Channel1, Channel2, or Channel3.

In some example embodiments, each group of LEDs 204, 206, 208 includes a number of LEDs that are connected in series with each other within each group. Each group of LEDs 204, 206, 208 may also emit a light having a color that is different from the color of a light emitted by the remaining groups of LEDs 204, 206, 208. One or more of the groups of LEDs 204, 206, 208 may also emit a light having the same color as the light emitted by at least one other group of the groups of LEDs 204, 206, 208. One or more LEDs within at least one group of LEDs 204, 206, 208 may also emit a light having a color that is different from the color of the light emitted by other LEDs in the group. In some alternative embodiments, one or more groups of the groups of LEDs 204, 206, 208 may include a single LED instead of the multiple LEDs shown in FIG. 2. In yet other alternative embodiments, each group of LEDs 204, 206, 208 may include LEDs that are connected in parallel with each other.

In some example embodiments, the lights emitted by the different groups of LEDs 204, 206, 208 may be combined in the lighting device 200 to produce a combined light that has a desired color. As described above, the controller U2 controls the intensity of light emitted by each group of LEDs 204, 206, 208 based on time periods of assertion and deactivation of each of the control signals Channel1, Channel2, Channel3. The controller U2 can thus control the intensity of the particular color light emitted by each group of LEDs 204, 206, 208 based on the time periods of assertion and deactivation of each of the control signals Channel1, Channel2, Channel3. By controlling the intensity of the different color lights emitted by the different groups of LEDs 204, 206, 208, the controller U2 can control the combined color of the light produced by the lighting device 200.

In some example embodiments, the controller U2 may use information indicative of the temperature near the lighting device 200 to set or change the time periods of assertion and deactivation of each control signal Channel1, Channel2, Channel3. To illustrate, the controller U2 may receive temperature information from a component 210 (e.g., a thermistor). For example, the controller U2 may include an analog-to-digital converter that converts an analog signal from the component 210 to one or more digital signals that are processed by the controller U2. The analog signal with temperature information may be provided to pin 2 of the controller U2.

In some example embodiments, the controller U2 may use user preference information to set or change the time periods of assertion and deactivation of each control signal Channel1, Channel2, Channel3. For example, user preference information may be provided to pin 1 of the controller U2 using a curve selection signal from the switch 202. For example, the curve selection signal may indicate a user preference for a warmer color light or for a softer color light to be emitted by the lighting device 200. Although the lighting device 200 includes the switch 202 as shown in FIG. 2, in alternative embodiments, another component or means may be used to provide user preference information to the controller U2.

In some example embodiments, the controller U2 may set or change the time periods of assertion and deactivation of the control signal Channel1 based on the current flowing through the group of LEDs 204. For example, the controller U2 may set or change the time periods of assertion and deactivation of the control signal Channel1 based on the average value of the current that flows through the group of LEDs 204. The controller U2 may also set or change the time periods of assertion and deactivation of the control signals Channel2, Channel 3 in a similar manner as the control signal Channel1. For example, the controller U2 may set or change the time periods of assertion and deactivation of each control signal Channel1, Channel2, Channel3 using the current measurement signal provided to pin 18 of the controller U2 and which is based on current flow through the groups of LEDs 204, 206, 208.

In some example embodiments, the controller U2 may set or change the time periods of assertion and deactivation of each control signal Channel1, Channel2, Channel3 based on other factors such as time of day and type of the LEDs in the groups of LEDs 204, 206, 208. Thus, the controller U2 may use different factors and inputs to determine intensity of the light emitted by each group of LEDs 204, 206, 208 to produce a desired color of the combined light.

In some example embodiments, the controller U2 may change a first time period that the control signal Channel1 is asserted without changing a second time period that the control signal Channel1 is deactivated. Alternatively, the controller U2 may change both the first time period that the control signal Channel1 is asserted and the second time period that the control signal Channel1 is deactivated. The sum of the first time period and the second time period may be changed or may alternatively be substantially unchanged after the controller U2 changes the first time period and the second time period.

In some example embodiments, the controller U2 may be a microprocessor or microcontroller. For example, the controller U2 may be an integrated circuit device from Microchip Technology (e.g., part number PIC16F1827). In some example embodiments, the controller U2 may include a memory device for storing code that may be executed by the controller U2 to perform one or more of the operations described above and for storing data for use in the operations or resulting from the operations performed by the controller U2. Alternatively or in addition, the controller U2 may access software code and data, and store data in a memory device outside of the controller U2.

Although example values of some elements (e.g., Rcs) of the lighting device 200 are shown in FIG. 2, these values are for illustrative purposes, and other values may be used without departing from the scope of this disclosure. Further, some elements of the lighting device 200 shown in FIG. 2 may be omitted without departing from the scope of this disclosure. Although the transistors Q0, Q1, Q2 are shown as Bipolar Junction Transistors in FIG. 2, in some alternative embodiments, the transistors Q0, Q1, Q2 may be other types of transistors such as MOSFETS. Further, the controller U2 may generate more than six or fewer than six control signals. Although three groups of LEDs 204, 206, 208 are shown in FIG. 2, in some alternative embodiments, the lighting device 200 may include fewer than three or more than three groups of LEDs. Further, although six LEDs are shown in each group of LEDs 204, 206, 208, in alternative embodiments, each group of LEDs 204, 206, 208 may include more or fewer than six LEDs without departing from the scope of this disclosure. The number of control signals Channel1, Channel2, etc. may affect a resolution of color adjustment of the light emitted by the lighting device 200, and thus may be selected based on a desired resolution of color adjustment. For example, more control signals with a corresponding number of LED groups generally allows for finer color adjustment of the light emitted by the lighting device 200.

Figure 3:
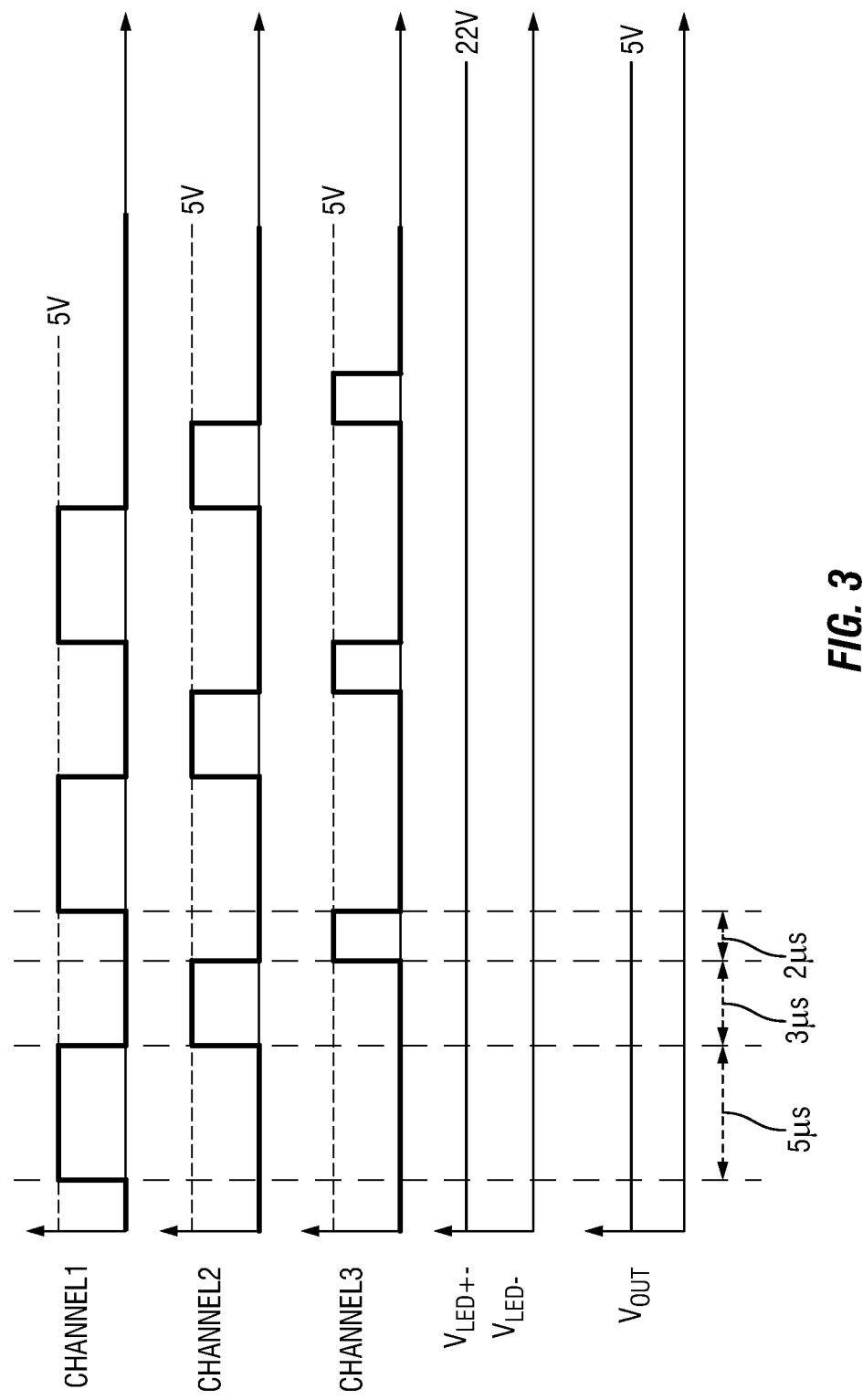
FIG. 3 illustrates signal traces corresponding to signals of the control device of FIG. 2 according to an example embodiment.

FIG. 3 illustrates signal traces corresponding to signals of the control device of FIG. 2 according to an example embodiment. Referring to the illustrative examples of time durations, amplitudes, and relationships between signals shown in FIG. 3, each of the control signals Channel1, Channel2, Channel3 may, for example, change between approximately 0 volt and approximately 5 volts. For example, the control signal Channel1 may be at 5 volts for approximately 5 microseconds and at 0 volt for approximately 5 microseconds during a total time period of 10 microseconds. Similarly, the control signal Channel2 may be at 5 volts for approximately 3 microseconds and at 0 volt for approximately 7 microseconds. The control signal Channel3 may be at 5 volts for approximately 2 microseconds and may be at 0 volt for approximately 8 microseconds. Although the time periods that the control signals Channel1, Channel2, Channel3 are asserted do not overlap in FIG. 3, in alternative embodiments, some or all of the assertion time periods may at least partially overlap. As described above with respect to FIG. 2, the controller U2 of FIG. 2 may set or change the time periods that the control signals Channel1, Channel2, Channel3 are asserted or deactivated to control the color of the combined light emitted by the lighting device 200.

As illustrated in FIG. 3, a voltage difference between LED+ and LED− of the lighting device 200 may be 22 volts. The voltage level at the output pin (Vout) of the voltage regulator U1 may be at approximately 5 volts based on the 22 volts voltage difference between LED+ and LED−.

FIGS. 4A and 4B illustrate signal traces corresponding to signals of the control device of FIG. 2 according to an example embodiment. I(L1) corresponds to the current flowing through the inductor L1 shown in FIG. 2. I(Q0) corresponds to the current flowing through the transistor Q0. I(Q1) corresponds to the current flowing through the transistor Q1. I(Q2) corresponds to the current flowing through the transistor Q2. For example, the inductor current I(L1) may have a magnitude of 1.0 ampere. As shown in FIGS. 4A and 4B, the signal trace I(Q0) may have a magnitude of 1.0 ampere for 50% of for 10 microseconds. For example, the time duration that I(Q0) is at 1.0 ampere may correspond to the duration of the control signal Channel1 shown in FIG. 3.

As shown in FIGS. 4A and 4B, I(Q1) may have a magnitude of 1.0 ampere for 30% of the 10 microseconds duration, and I(Q2) may have a magnitude of 1.0 ampere for 20% of the 10 microseconds duration. The time duration that I(Q1) is at 1.0 ampere may correspond to the duration of the control signal Channel2 shown in FIG. 3. Similarly, the time duration that I(Q2) is at 1.0 ampere may correspond to the duration of the control signal Channel3 shown in FIG. 3.

Based on the above illustrative example values, the average current 402, 404, 406 that flows through each of the transistors Q0, Q1 Q2 and thus through the corresponding group of LEDs 204, 206, 208 is approximately 500 milliamperes (mA) for I(Q0), 300 mA for I(Q1), and 200 mA for I(Q2) respectively. As shown in FIG. 4B, the current flow through the groups of LEDs 204, 206, 208 may be smoothed out by use of the capacitors C0, C1, C2. The trace 402 corresponds to 500 mA average current with some ripple, the trace 404 corresponds to 300 mA average current with some ripple, and the trace 406 corresponds to 200 mA average current with some ripple.

As described above with respect to FIG. 2, the controller U2 of FIG. 2 may set or change the time periods that the control signals Channel1, Channel2, Channel3 are asserted or deactivated to control the average currents 402, 404, 406 that flow through the groups of LEDs 204, 206, 208. Thus, by controlling the time periods that the control signals Channel1, Channel2, Channel3 are asserted or deactivated, the controller U2 may control intensity of light from each group of LEDs 204, 206, 208 and thus control the color of the combined light emitted by the lighting device 200.

Figure 5:
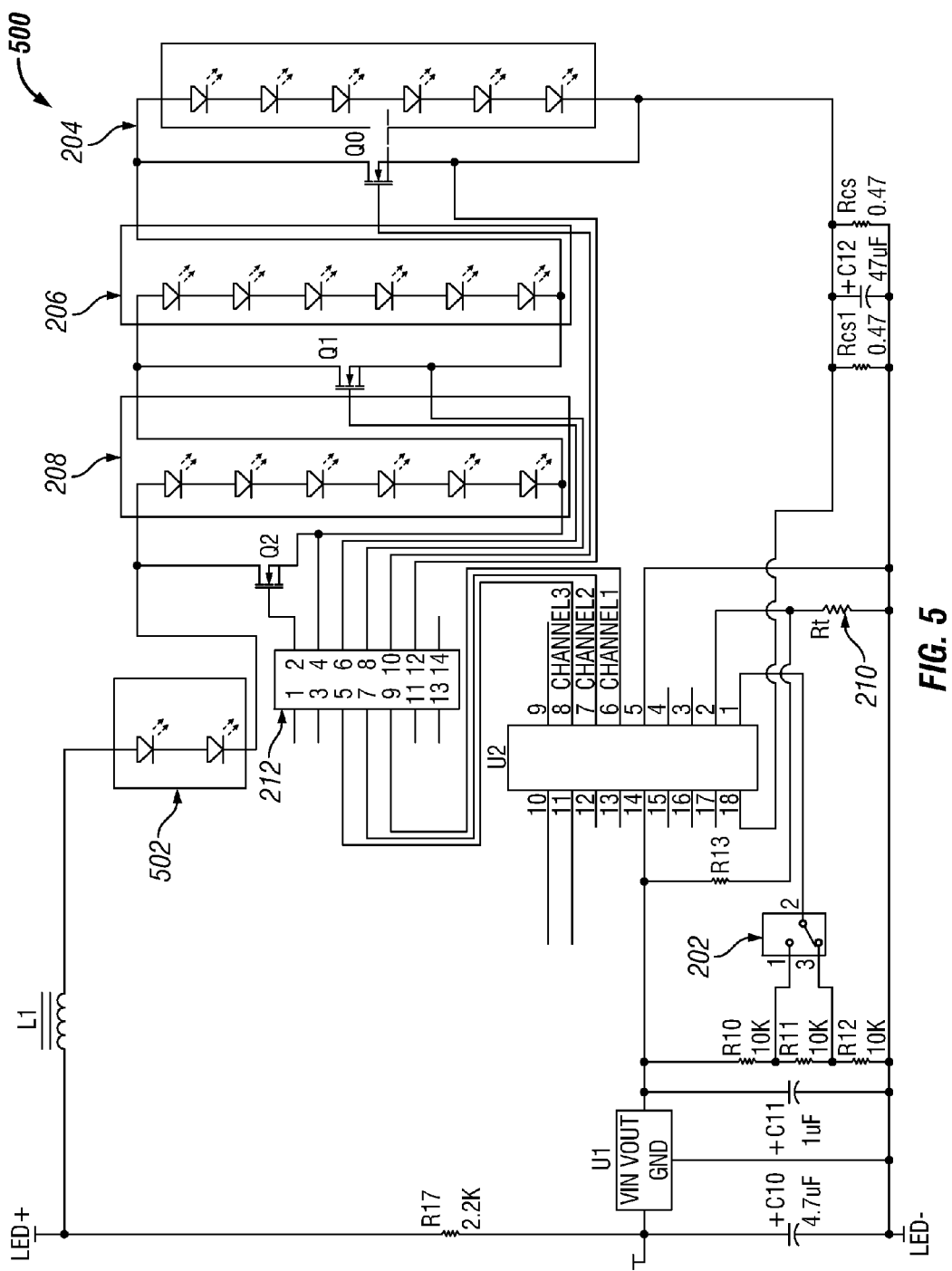
FIG. 5 is a diagram illustrating a lighting device including color controller circuitry according to another example embodiment.

FIG. 5 is a diagram illustrating a lighting device 500 including color controller circuitry according to another example embodiment. In some example embodiments, the components of the lighting device 500 such as the voltage regulator U1, the controller U2, and the switch 202 may be the same or similar to the respective components shown in FIG. 2 and may generally operate in the manner described with respect to FIG. 2. As described above with respect to FIG. 2, each group of LEDs 204, 206, 208 may include LEDs that emit a particular color light that is different from the color of light emitted by the LEDs of the other groups of LEDs 204, 206, 208. In contrast to the parallel configuration of the groups of LEDs 204, 206, 208 shown in FIG. 2, in FIG. 5, the groups of LEDs 204, 206, 208 are serially connected to each other.

In some example embodiments, each group of LEDs 204, 206, 208 may include one or more LEDs that emit white light and one or more LEDs that emit light that has a color, such as red, green, etc. Further, in some example embodiments, each group of LEDs 204, 206, and 208 may have LEDs that emit a different color light from some or all of the other LEDs in the group. In some example embodiments, one or more of the groups of LEDs 204, 206, and 208 may emit white light only.

As shown in FIG. 5, the first transistor Q0 is connected in parallel with the first group of LEDs 204. The second transistor Q1 is connected in parallel with the second group of LEDs 206. The third transistor Q2 is connected in parallel with the third group of LEDs 208. When the first transistor Q0 is turned on by asserting the first control signal Channel1, the first group of LEDs 204 are turned off. When the second transistor Q1 is turned on by asserting the second control signal Channel2, the second group of LEDs 206 are turned off. When the third transistor Q2 is turned on by asserting the third control signal Channel3, the third group of LEDs 208 are turned off. In the example embodiment of FIG. 5, all three control signals Channel1, Channel2, and Channel3 may be in an asserted state simultaneously, or may be in a deactivated state simultaneously. Further, each of the control signals Channel1, Channel2, and Channel3 may be in asserted or deactivated state while one or more of the other control signals is in an asserted or deactivated state.

As shown in FIG. 5, the lighting device 500 may also include another group of LEDs 502. The LEDs in the group of LEDs 502 are not controlled by the control signals Channel1, Channel1, and Channel3. In some example embodiments, the group of LEDs 502 may emit a light that has a color that is different from the color of light emitted by the other groups of LEDs 204, 206, 208.

In some example embodiments, the controller U2 may control light emitted by the lighting device 500 by controlling the duration of time that the control signals Channel1, Channel2, and Channel3 are asserted or deactivated similar to the manner described with respect to FIG. 2. For example, the controller U2 may set the duration of time the control signals Channel1, Channel2, and Channel3 are asserted or deactivated based on, for example, a type of the LEDs in the groups of LEDs 204, 206, 208, the current flowing through each group of LEDs 204, 206, 208, temperature of an area near the lighting device, time of day, or a combination thereof. For example, the controller U2 may set the duration of time the control signals Channel1, Channel2, and Channel3 are in an asserted state based on the type of LEDs, which may vary, for example, from one manufacturer to another.

In some example embodiments, the lighting device 500 also includes a transistor driver 504 (e.g., a MOSFET driver) that provides signals with appropriate levels to the transistors Q0, Q1, Q2 based on the control signals Channel1, Channel2, and Channel3. Although, the transistors Q0, Q1, Q2 are shown as N-channel MOSFETS in FIG. 5, in alternative embodiments, the transistors Q0, Q1, Q2 may be P-channel MOSFETS or other types of transistors. For example, when using P-channel MOSFETS, corresponding change in polarity of the control signals Channel1, Channel2, and Channel3 may be required. In some example embodiments, the color controller 108 of FIG. 1 may include all elements shown in FIG. 5 except for the groups of LEDs 204, 206, 208, 502 and the transistors Q0, Q1, Q2.

Figure 6:
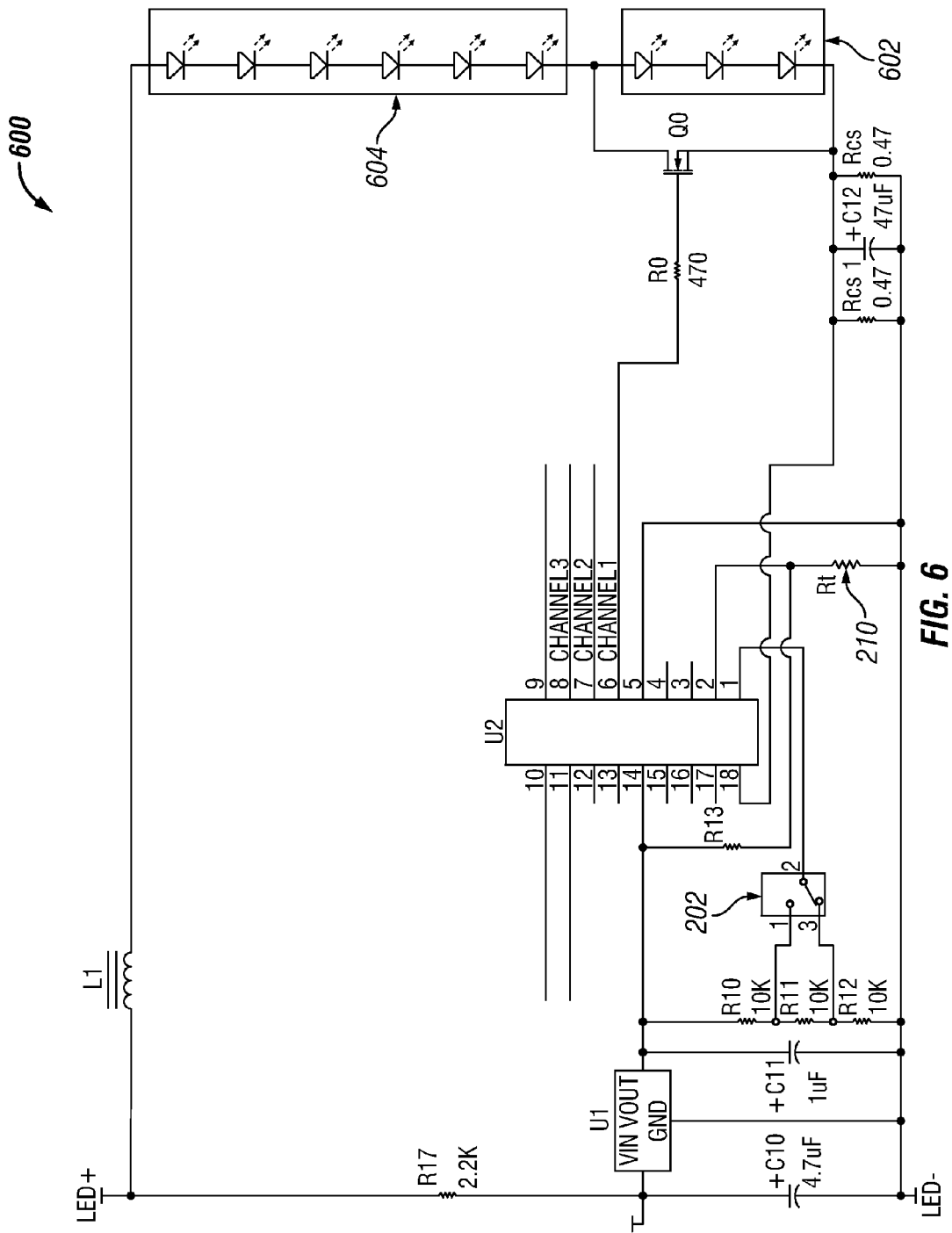
FIG. 6 is a diagram illustrating a lighting device including color controller circuitry according to another example embodiment.

FIG. 6 is a diagram illustrating a lighting device 600 including color controller circuitry according to another example embodiment. In some example embodiments, the components of the lighting device 600 such as the voltage regulator U1, the controller U2, and the switch 202 may be the same or similar to the respective components shown in FIG. 2 and may generally operate in a manner described with respect to FIG. 2. Further, the lighting device 600 may include two groups of LEDs 602, 604. In some example embodiments, the color controller 108 of FIG. 1 may include all elements shown in FIG. 6 except for the group of LEDs 602, 604 and the transistors Q0, Q1, Q2.

As shown in FIG. 6, the control signal Channel1 controls the transistor Q0. By controlling the duration of time the control signal Channel1 is asserted and deactivated, light emitted by the lighting device 600 may be changed in a manner similar to the lighting devices 200, 500. To illustrate, when the control signal Channel1 is asserted, the transistor Q0 is turned on, which in turn results in the group of LEDs 602 being turned off. The group of LEDs 604 can remain turned on regardless of whether the transistor Q0 is turned on. Each group of LEDs 602, 604 may include LEDs that emit light that has a color that is the same or different from the color of light emitted by the other LEDs in the group. In some example embodiments, the number of LEDs in each group of LEDs 602, 604 may be fewer or more than shown in FIG. 6

Although particular embodiments have been described herein in detail, the descriptions are by way of example. The features of the example embodiments described herein are representative and, in alternative embodiments, certain features, elements, and/or steps may be added or omitted. Additionally, modifications to aspects of the example embodiments described herein may be made by those skilled in the art without departing from the spirit and scope of the following claims, the scope of which are to be accorded the broadest interpretation so as to encompass modifications and equivalent structures.

What is claimed is:
1. A lighting device comprising:
a first group of light emitting diodes (LEDs);
a second group of LEDs; and
a color controller configured to:
repeatedly assert and deactivate a first control signal to control whether the first group of LEDs are turned on or turned off, wherein the color controller asserts the first control signal for a first time period of a total time period and deactivates the first control signal for a second time period of the total time period, the first time period and the second time period adding up to the total time period; and repeatedly assert and deactivate a second control signal to control whether the second group of LEDs are turned on or turned off, wherein the color controller asserts the second control signal for a third time period during the total time period, wherein the first time period and the third time period each fall within a range from approximately zero to approximately the total time period, wherein a sum of the first time period and the third time period equals at least the total time period, wherein the color controller changes a color of the light emitted by the first group of LEDs and the second group of LEDs by changing one or both of the first time period and the third time period, and wherein multiple ones of the total time period are adjacent to each other.

2. The lighting device of claim 1, wherein the color controller is configured to change one or both of the first time period and the third time period based on at least one of a type of LEDs, a current flowing through the one or more LEDs, a temperature of an area surrounding the lighting device, and time of day.

3. The lighting device of claim 1, wherein the color controller deactivates the second control signal for a fourth time period, wherein the third time period and the fourth time add up to approximately the total time period, and wherein the first time period and the third time period overlap with each other.

4. The lighting device of claim 1, wherein the first group of LEDs include at least one LED configured to emit colored light and wherein the second group of LEDs include at least one LED configured to emit white light.

5. The lighting device of claim 1, wherein the first control signal is deactivated when the second control signal is asserted.

6. The lighting device of claim 1, wherein the first group of LEDs are turned off in response to the first control signal being asserted.

7. The lighting device of claim 6, wherein the first group of LEDs are serially connected with the second group of LEDs and wherein the first group of LEDs is in parallel with a transistor that is turned on in response to the first control signal being asserted.

8. The lighting device of claim 7, wherein a second transistor is in parallel with the second group of LEDs.

9. The lighting device of claim 1, wherein the first group of LEDs are in series with a first transistor, wherein the second group of LEDs are in series with a second transistor, and wherein the first group of LEDs and the first transistor are in a parallel configuration with the second group of LEDs and the second transistor.

10. The lighting device of claim 9, further comprising a first capacitor in parallel with the first group of LEDs, and a second capacitor in parallel with the second group of LEDs.

11. A lighting fixture, comprising:
a light emitting diode (LED) driver; and
a lighting device, wherein the LED driver provides power to the lighting device, the lighting device comprising a first group of light emitting diodes (LEDs), a second group of LEDs, a third group of LEDs and a color controller, wherein the color controller is configured to:
repeatedly assert and deactivate a first control signal to control whether the first group of LEDs are turned on or turned off, wherein the color controller asserts the first control signal for a first time period of a total time period and deactivates the first control signal for a second time period of the total time period, the first time period and the second time period adding up to the total time period;

repeatedly assert and deactivate a second control signal to control whether the second group of LEDs are turned on or turned off, wherein the color controller asserts the second control signal for a third time period during the total time period; and repeatedly assert and deactivate a third control signal to control whether the third group of LEDs are turned on or turned off, wherein the color controller asserts the third control signal for a fifth time period during the total time period, wherein the first time period, the third time period, and the fifth time period each fall within a range from approximately zero to approximately the total time period, wherein a sum of the first time period, the third time period, and the fifth time period equals at least the total time period, and wherein multiple ones of the total time period are adjacent to each other.

12. The lighting fixture of claim 11, wherein the color controller deactivates the second control signal for a fourth time period, wherein the third time period and the fourth time add up to approximately the total time period, and wherein the first time period and the third time period overlap with each other.

13. The lighting fixture of claim 11, wherein the first group of LEDs are serially connected with the second group of LEDs, wherein a first transistor is in parallel with the first group of LEDs, and wherein a second transistor is in parallel with the second group of LEDs.

14. The lighting fixture of claim 11, wherein the first group of LEDs are in series with a first transistor, wherein the second group of LEDs are in series with a second transistor, and wherein the first group of LEDs and the first transistor are in a parallel configuration with the second group of LEDs and the second transistor.

15. The lighting fixture of claim 11, further comprising a dimmer that controls a magnitude of a current provided by the LED driver.

16. A method of controlling a color of a light emitted by a lighting device, the method comprising:
providing a current to a first group of light emitting diodes (LEDs) and a second group of LEDs configured to emit a combined light;
asserting, by a color controller, a first control signal for a first time period;
deactivating, by the color controller, the first control signal for a second time period, the first time period and the second time period adding up to a total time period;
asserting, by the color controller, a second control signal for a third time period; and
deactivating, by the color controller, the second control signal for a fourth time period, wherein the third time period and the fourth time period add up to approximately the total time period, wherein the first time period and the third time period each fall within a range from approximately zero to approximately the total time period, wherein a color of the combined light depends on the first time period and the third time period, wherein asserting and deactivating the first control signal controls whether the current flows through the first group of LEDs, and wherein multiple ones of the total time period are adjacent to each other.

17. The method of 16, wherein the first group LEDs are turned off by asserting the first control signal.

18. The method of claim 16, wherein the first time period and the third time period overlap with each other.

19. The method of claim 16, wherein changing the first time period includes determining the first time period based on at least the current flowing through the first group of LEDs.

20. The method of claim 19, wherein determining the first time period is further based on at least one of a type of LEDs of the first group of LEDs, a temperature of an area surrounding the first group of LEDs, and time of day.

* * * * *